Oct. 12, 1954     H. J. FRANK     2,691,305
BAROMETRIC ALTIMETER
Filed May 17, 1952     2 Sheets-Sheet 1
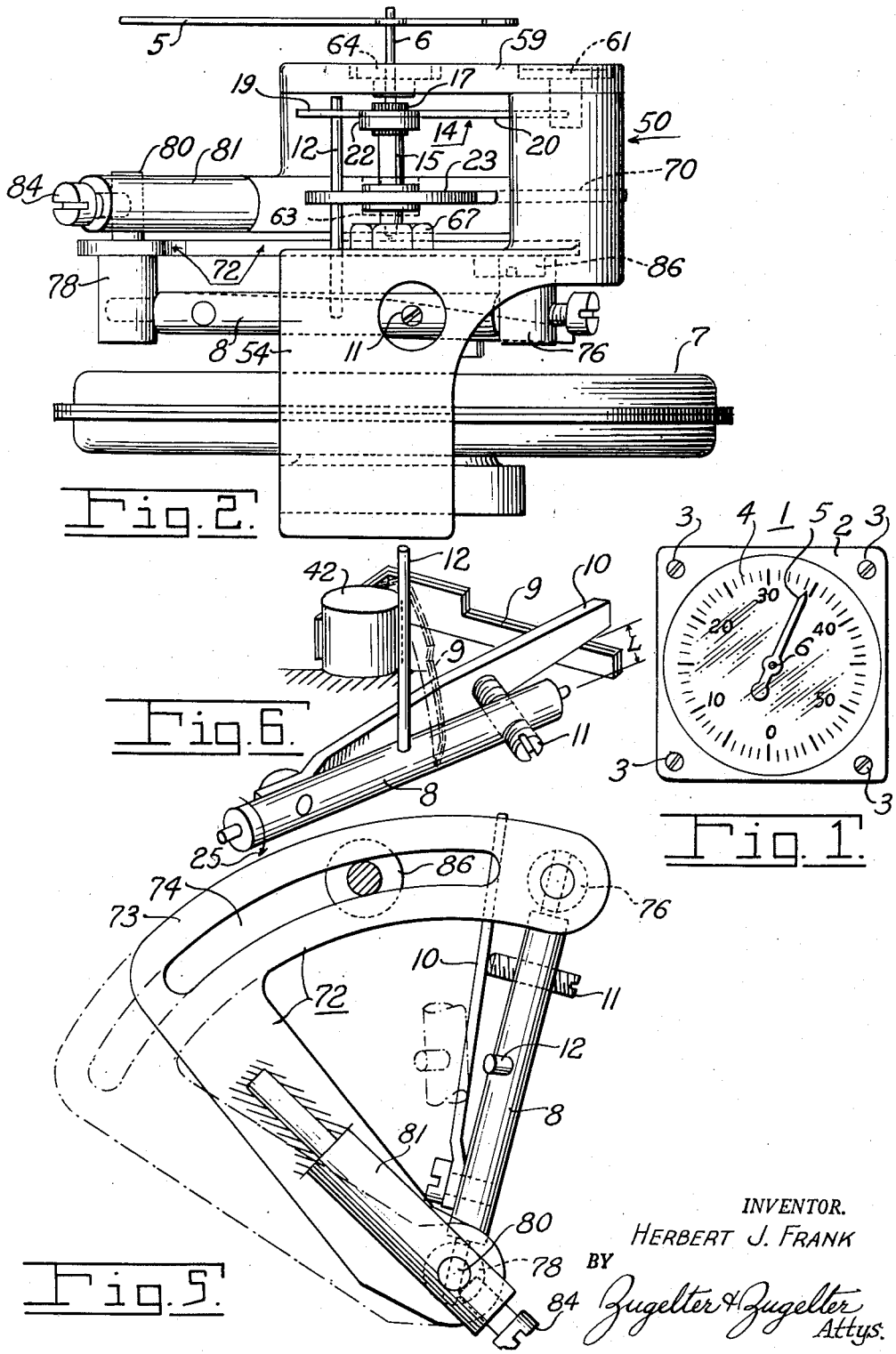
INVENTOR.
HERBERT J. FRANK
BY
Zugelter & Zugelter
Attys.

Oct. 12, 1954

H. J. FRANK 2,691,305

BAROMETRIC ALTIMETER

Filed May 17, 1952

INVENTOR.
HERBERT J. FRANK
BY
Jugelter & Jugelter
Attys.

UNITED STATES PATENT OFFICE 2,691,305

BAROMETRIC ALTIMETER

Herbert J. Frank, Cincinnati, Ohio, assignor to The Lackner Company, Incorporated, Cincinnati, Ohio, a corporation of Ohio Application May 17, 1952, Serial No. 288,495

6 Claims. (Cl. 73—386)

This invention relates to altimeters.

The object of this invention is to provide an altimeter of the aneroid or barometric type that will give linear readings of the altitude at altitudes ranging from sea level to 80,000 feet more or less.

Another object of the invention is to provide an altimeter having automatic temperature compensation so that the altimeter will give linear readings of altitude over a wide range of temperatures.

A further object of the invention is to provide a barometric diaphragm for an altimeter so constructed that its deflections will substantially conform to the readings of a mercury manometer over a range of altitude from sea level upwards to 60,000 to 80,000 feet.

A still further object of the invention is to provide a driving connection between a diaphragm of the type set forth in the next preceding object and a gear sector which is so constructed that the deflections of the diaphragm will result in readings on the altimeter scale that are linearly proportional to altitude throughout its entire range of operation.

A still further object of the invention is to provide an altimeter with adjustments whereby the deflections of the diaphragm will be caused to follow the scale indications throughout its entire range of operation.

Other objects of the invention will be apparent to those skilled in this particular art from the following description taken in conjunction with the accompanying drawings in which:

Figure 1 is a front view of an altimeter in its case or housing showing the scale and indicator thereof;

Fig. 2 is an enlarged view in side elevation of the altimeter mechanism which is mounted in the case or housing of Fig. 1;

Figure 3:
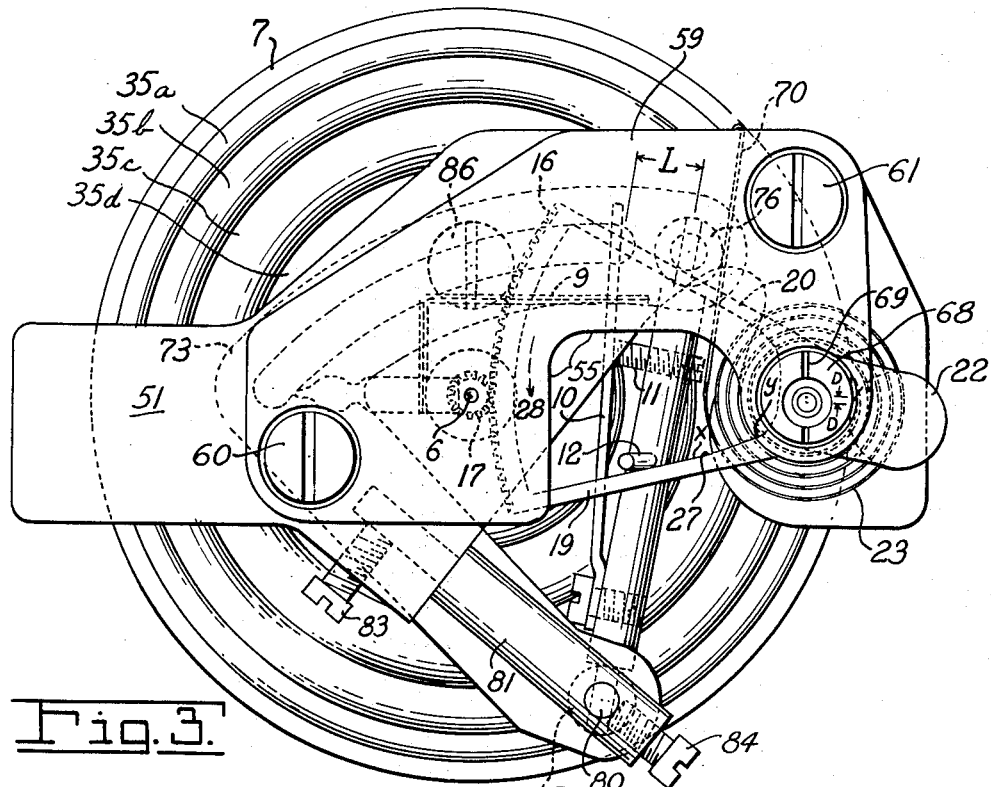
Fig. 3 is a top plan view of Fig. 2 turned 90° counterclockwise.
Figure 4:
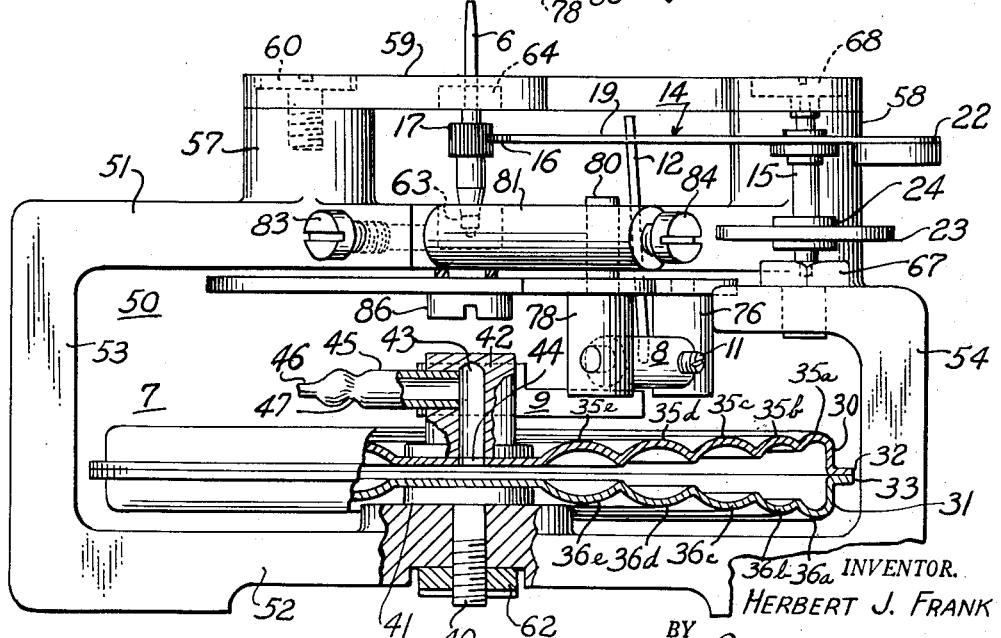
Fig. 4 is a view in side elevation of Fig. 3 with a portion of the diaphragm shown in section.

Fig. 5 is a top plan view of a frame and shaft assembly embodied in the altimeter, the frame and shaft assembly being pivotally mounted to provide an adjustment between a gear sector and shaft embodied in the altimeter; and Fig. 6 is a view in perspective of the shaft shown in Fig. 5 and the driving connection between the shaft and the center of the diaphragm shown in Figs. 2, 3 and 4, the connection between the diaphragm and the shaft being a temperature-compensated one.

In Fig. 1 of the drawings an altimeter 1 is shown in front view. The altimeter includes a housing or case having a cover 2, which may be secured to the case at the four corners by means of screws 3. The case is provided with a dial 4 having a uniform scale graduated in altitude, as for example 0 to 60,000 feet above sea level. While the scale has been shown as extending from 0 to 60,000 feet above sea level, it will be understood that the scale may be calibrated to read 0 to 80,000 or other maximum upper limit. Registering with the scale is a pointer 5 mounted on a shaft 6.

The mechanism whereby the shaft 6 and the pointer 5 are turned from the 0 reading to the various altitude readings is illustrated in Figs. 2 to 6, inclusive. The mechanism illustrated in those views is drawn to a scale much greater than that employed in Fig. 1, the scale of Fig. 1 being approximately full scale.

The altimeter mechanism comprises a diaphragm 7 and shaft 8 which is arranged to be turned about its longitudinal axis by the diaphragm through a cantilever arm 9 which is secured to the central portion of the diaphragm and a radius arm 10. Arm 10 is secured cantilever fashion to shaft 8 and is disposed at an adjustable angle to the longitudinal axis thereof. The angle between the arm 10 and the longitudinal axis of shaft 8 may be adjusted by means of a screw 11. The point at which arm 9 engages arm 10 and also the angle at which arm 10 is disposed to the longtudinal axis of shaft 8 determines the length of the lever or crank arm acting on the shaft. The length of that arm is indicated in Fig. 6 by the letter L.

The shaft 8 is provided with a cam pin 12 that acts on a gear sector 14 pivotally mounted on a pivot 15. The gear sector is provided with a gear segment 16 that meshes with a pinion 17 secured to shaft 6 on which pointer 5 is mounted.

As shown in Fig. 3 the gear segment includes angularly disposed arms 19 and 20 that radiate from the pivot 15 to the ends of the gear segment 16. The gear sector also includes a counterweight 22. The gear sector is biased towards zero position, that is in a counterclockwise direction, as viewed in Fig. 3, by means of a hair spring 23. The outer end of the hair spring is anchored in the chassis of the altimeter mechanism and the inner end thereof is secured to a hub 24 on the pivot 15.

When the shaft 8 turns in a clockwise direction or in the direction of arrow 25 as seen in Fig. 6, cam pin 12 slides along the inner face 27 of sector arm 19, causing the sector to turn in the direction of arrow 28 as seen in Fig. 3 or in a counterclockwise direction. As the sector turns in the direction of arrow 28 pinion 17 is caused to turn in a clockwise direction that is in the direction of increasing altitudes.

As the altitudes decrease diaphragm 7 contracts whereby shaft 8 turns in a direction opposite to that indicated by arrow 25 causing the pointer 5 to turn to lower readings and to assume a position corresponding to the altitude at which the altimeter may be at any particular time.

Since it is known that the deflection of aneroid diaphragms do not have the same total deflection per unit change of altitude at increasing altitudes, the diaphragm 7 and the gear sector 14 particularly the cam surface 27 of arm 19 thereof have been so designed that the deflection of pointer 5 will be uniform per unit of altitude throughout the entire range of the altimeter. As shown in Fig. 4 the altimeter 7 comprises a pair of complementary dish-like members 30 and 31 having marginal abutting flanges 32 and 33 which are joined together by brazing or other suitable bond. The bottoms of members 30 and 31 are provided with a plurality of die formed annular concentrically arranged corrugations 35a to 35e and 36a to 36e. These corrugations increase in width and depth from the outer edge to the central portions of members 30 and 31. When the corrugations 35a–d and 36a–d have been formed the corrugated bottoms are substantially parallel to each other, when the pressure on the inside of the diaphragm is equal to the external pressure.

The central portion of diaphragm member 31 is provided with means for securing the diaphragm in the frame. This means includes a bolt 40 having a relatively large head 41 that is secured to the central portion of the diaphragm member 31 by brazing, soldering or other suitable means.

Diaphragm 30 is provided at its central portion with a boss 42 having a drilled center 43 that communicates with the space between the diaphragm members 30 and 31 through an aperture 44 in the central portion of member 30. A lateral 45 in the form of a short section of thin metal tubing is mounted in a side opening in boss 42 that communicates with the drilled passageway 43. The lateral tubing 45 serves as a connection to a vacuum pump system by means of which the hollow of the diaphragm may be evacuated to as low a vacuum as possible after which the tube 45 is sealed off as at 46 and 47.

After evacuation when the diaphragm is at sea level it will be appreciated that the bottoms of members 30 and 31 are deflected towards each other by the external atmospheric pressure. As the barometric pressure decreases with increasing altitudes these members tend to separate, the force causing them to separate resulting from the inherent resiliency or spring action of the bottoms of members 30 and 31.

As the pressure on the exterior of diaphragm 7 decreases with increased altitude, the corrugated bottoms of members 30 and 31 expand or return towards the position they were in before evacuation of the diaphragm. Because of the form and arrangement of the corrugations in members 30 and 31, the separation of the corrugated bottoms, i. e., deflection, in response to increased altitudes is substantially proportional to what the readings of the mercury manometer would be over the same range of increasing altitudes.

As stated supra, the cam surface 27 of the gear sector 14 is so shaped that the indicator hand 5 will move in equal increments per unit of altitude throughout the entire range of the altimeter. By constructing the diaphragm as above described, the surface of cam 27 can be straight from the gear segment 16 to approximately the point X, and from point X to point Y the surface is curved so that at the upper limits of altitude range where the diaphragm deflections become quite small and less uniform, the gear sector will be turned through a sufficient angle to give linear dial readings at the high altitudes.

The altimeter mechanism includes a loop-shaped chassis 50, which can conveniently be die cast. The chassis includes parallel front and rear members 51 and 52, and connecting end of members 53 and 54. Member 51 is hook-like in shape, to provide window or opening 55 through which cam pin 12 can extend. Member 51 is provided also with posts 57 and 58 on which a bearing plate 59 may be mounted and secured by means of screws 60 and 61.

Diaphragm 7 is secured to member 52 by screw 40 and a nut 62 as shown in Fig. 4.

Spindle 6 is mounted at its lower end in a bearing 63 secured to chassis member 51 and, at a point above pinion 17, in a bearing 64 mounted in plate 59.

The sector pivot or shaft 15 is supported at its lower end in a bearing 67, secured to member 51, and its upper end is journaled in an eccentric bearing 68, mounted in plate 59. Bearing 68 is provided with a tool slot 69 whereby it may be turned about its own axis and eccentrically to the axis of sector pivot or shaft 15, whereby the gear sector 14 may be moved towards or from pinion 17 to thereby control the depth of mesh between teeth 16 and the pinion teeth. In practice, this adjustment is so made as to eliminate as far as possible any back lash between the pinion and the sector teeth without causing any binding between them. The amount of eccentricity between bearing 68 and the center of spindle 15 is indicated in Fig. 3 by the dimension D.

As shown in Fig. 2, the outer end of hair spring 23 is passed through and enclosed in a slot 70 in member 51 adjacent post 58. The inner end of that coil spring is, as stated previously herein, anchored in hub 24 of the spindle 15.

Shaft 8 and its angularly disposed lever arm 10 are carried by a frame 72. Frame 72 is substantially L-shaped. One side of frame 72 is an arcuate segment 73 in which is an arcuate slot 74. The free end of segment 73 is provided with a bearing post 76 in which one end of shaft 8 is journaled. The free end of the opposite leg of member 72 is provided with a bearing post 78 in which the other end of the shaft 8 is journaled, as shown in Fig. 5. Bearing post 78 has a pin 80 that extends upwardly through the L-shaped frame 72, and a cantilever 81 that is provided at one end with a pin extending into chassis member 51 where it is secured in place by a set screw 83. Pin 80 is firmly secured in cantilever 81 by a set screw 84.

Sector frame 72 is pivotly mounted on pin 80 and supported on the bearing post 78 so that the frame 72 may be turned about pin 80 as a pivot point. The frame 72 may be locked in any position by means of a screw 86 the shank of which extends through slot 74 and is threaded into chassis member 51.

As may be seen by inspection of Figs. 5 and 6, the turning of the frame 72 on its pivot 80 changes the angular position of shaft 8 and arm 10 with respect to temperature-compensated arm 9. It also changes the path of travel of cam pin 12 with respect to the cam surface 27 of the sector gear 14. By means of this adjustment the dial hand 5 may be caused to register with the proper scale division at any altitude reading. By adjusting the angularity of arm 10 with respect to the longitudinal axis of shaft 8 as by adjusting screw 11, the length of the crank arm between arm 9 and the longitudinal axis of shaft 8 may be adjusted. By utilizing the two adjustments mentioned, the dial hand 5 may be caused to read zero at sea level and the true value of altitude at other positions on the dial.

The temperature-compensated arm 9 may be in the form of a strip of bi-metal. The purpose of the bi-metallic element is to change the crank arm length in accordance with the ambient temperature to which the altimeter is subjected. As the temperature decreases arm 9 curls to the position indicated by the dotted position of the same. The dotted position may represent a position corresponding to an extremely low temperature whereas the full line position represents a much higher temperature. As the temperature decreases it may be seen by inspection of Fig. 6 that the crank arm L decreases. At a low temperature it will be apparent that the diaphragm 7 will not have the same deflection at a given altitude as it does at higher temperatures for the same altitude. Therefore, by decreasing the crank arm length L in proportion to the temperature a lesser deflection will give the same movement to dial hand 5 for a unit change of altitude as it would if the temperature were higher.

Having described the invention, it will be apparent to those skilled in this art that various modifications and changes may be made in the illustrated embodiments without departing from either the spirit or the scope of the invention.

Therefore what is claimed as new and desired to be secured by Letters Patent is:

1. An altimeter having an altitude scale, and comprising a chassis member, an evacuated diaphragm being free to expand and contract in response to changes in atmospheric pressure, a rotatable shaft mounted adjacent said diaphragm, a lever arm attached to said shaft, and disposed at an angle thereto, a bimetallic cantilever having its fixed end secured to the central portion of said diaphragm and its free end underlying and engaging said shaft lever arm, said bimetallic member responding to temperature changes to increase the effective length of said shaft lever arm with rising temperatures, and to decrease the effective length of said shaft lever arm with decreasing temperatures, a gear sector having a bearing at about the center of the sector and having an arm extending from a point adjacent said center to one end of the gear sector, a spring urging the sector towards a zero position, a pin secured to said shaft and engaging said sector arm and arranged to turn said sector as the diaphragm expands and contracts in response to changes in pressure, and an indicator shaft having a pinion meshing with said sector gear adapted to position a scale pointer along said scale to indicate altitude.

2. An altimeter according to claim 1 characterized by the fact that said shaft lever arm is a flexible cantilever, the fixed end of which is secured to said shaft adjacent one end thereof and that means are provided for deflecting said cantilever to increase or decrease the angle between it and the shaft whereby the effective radius arm between the diaphragm and shaft may be adjustably increased or decreased.

3. An altimeter according to claim 1 characterized by the fact that a frame is rotatably mounted on said chassis and that said shaft is journalled in bearings carried by said frame, said frame when rotated changing the point of contact between said bimetallic cantilever and said shaft lever arm.

4. An altimeter according to claim 1, characterized by the fact that the sector bearing is mounted in an eccentric, whereby the depth of mesh of the gear of the sector with the indicator shaft pinion may be adjusted.

5. An altimeter comprising a diaphragm adapted to deflect by, and in accordance with, barometric pressure resulting from changes in altitude, a first shaft, a driving connection with the diaphragm and shaft disposed to turn the shaft in response to deflections of the diaphragm, said driving connection between the first shaft and diaphragm comprising a lever arm on the first shaft disposed at an angle to the longitudinal axis thereof, means for adjusting the angle between said lever arm and first shaft, and a cantilever member secured to the central portion of said diaphragm, the free end portion of the cantilever underlying and engaging said first shaft lever arm, a second shaft having a pinion thereon, an indicator hand on the shaft, a gear segment meshing with the pinion, means for rotatively supporting said gear segment, a cam connected to said gear segment, and a cam pin mounted on said first shaft and drivingly engaging the cam of said gear segment, the contour of said cam surface being such that the rotational displacement of said pinion shaft is substantially linearly proportional to the value of altitude.

6. An altimeter comprising a diaphragm adapted to deflect by, and in accordance with, barometric pressure resulting from changes in altitude, a first shaft, a driving connection between the diaphragm and first shaft disposed to turn said shaft in response to deflections of the diaphragm, the driving connection between the first shaft and diaphragm comprising a lever arm on the first shaft that is disposed at an angle to the longitudinal axis thereof, means for adjusting the angle between said lever arm and first shaft, and a bimetallic cantilever member secured to the central portion of said diaphragm, the free end portion of the cantilever underlying and engaging said first shaft lever arm, a second shaft having a pinion thereon, an indicator hand on the shaft, a gear segment meshing with the pinion, means for rotatively supporting said gear segment, a cam connected to said gear segment, and a cam pin mounted on said first shaft and drivingly engaging the cam of said gear segment, the contour of said cam surface being such that the rotational displacement of said pinion shaft is substantially linearly proportional to the value of altitude.

References Cited in the file of this patent

UNITED STATES PATENTS

| Number | Name | Date |
| --- | --- | --- |
| 1,351,130 | Roesch | Aug. 31, 1920 |
| 1,933,195 | Urfer | Oct. 31, 1933 |
| 2,178,799 | Loen | Nov. 7, 1939 |
| 2,194,624 | Titterington, Jr. | Mar. 26, 1940 |
| 2,518,068 | Rodanet | Aug. 8, 1950 |
| 2,561,204 | Johnson | July 17, 1951 |